Sept. 27, 1938. S. A. McDOUGALL 2,131,666
APPARATUS FOR DEHYDRATING VISCOUS MATERIALS
Filed April 6, 1937
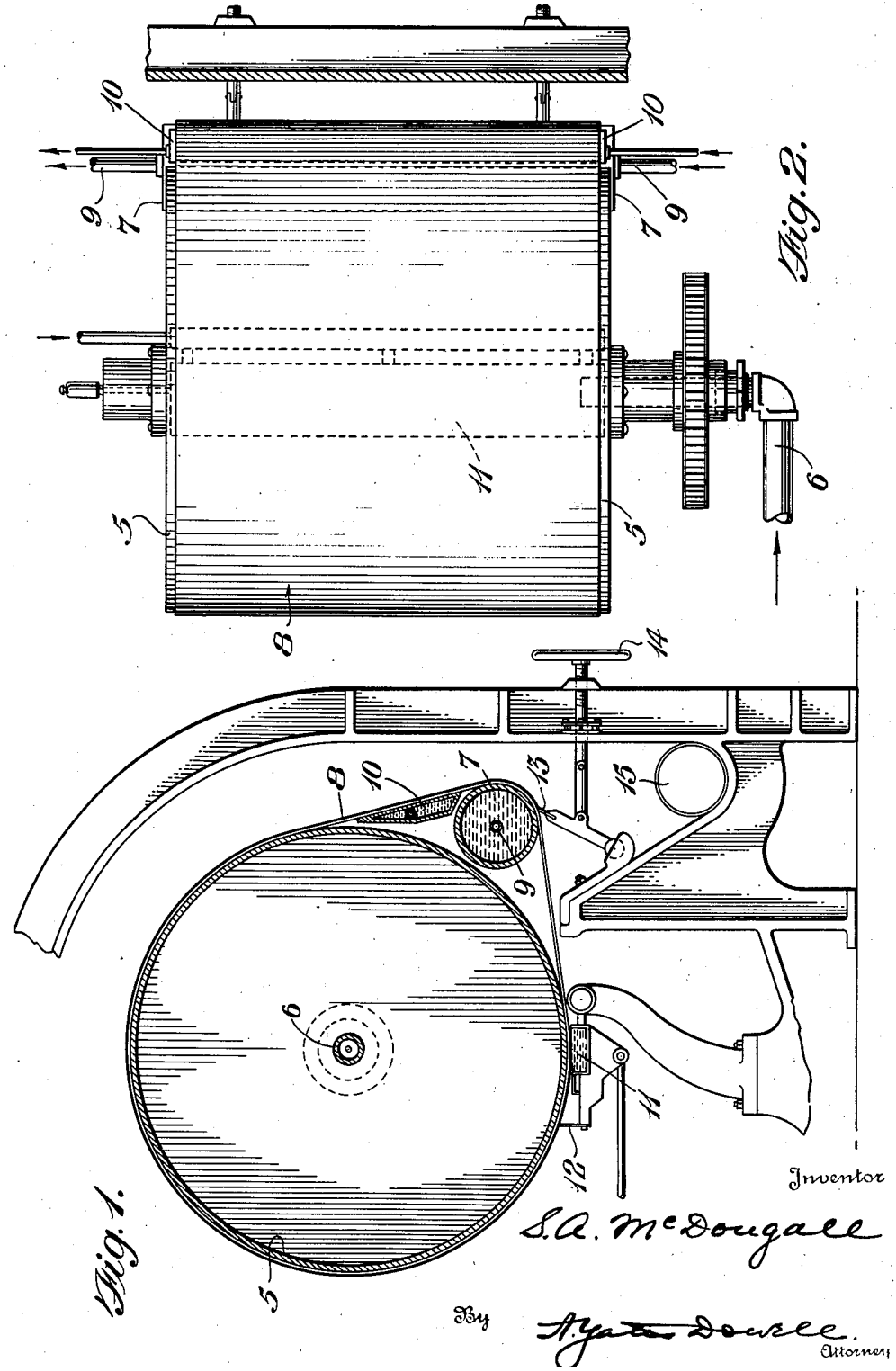

Patented Sept. 27, 1938

2,131,666

UNITED STATES PATENT OFFICE 2,131,666

APPARATUS FOR DEHYDRATING VISCOUS MATERIALS

Shirley A. McDougall, Indianapolis, Ind., assignor to Dextora Company, Indianapolis, Ind., a corporation of Indiana Application April 6, 1937, Serial No. 135,318

4 Claims. (Cl. 159—7)

This invention relates to the drying of viscid or fluid matter in order to remove the volatile components thereof and thereby reduce the fluid to a coagulated or concentrated layer, which layer is removed and generally disintegrated or given further treatment for commercial use. The invention has been found to be particularly applicable to the treatment of syrup in the manufacture of dry malt extract and other malt products.

In the manufacture of certain products such as dry malt extract, malt sugar and the like, the syrup or sticky viscid mass to be dried is generally applied or caused to adhere to the surface of a rotary drum which is heated by steam or other suitable agent, and when the mass becomes dry, the layer of material is cut from the drum by a knife and removed for disintegration or further treatment. Certain dehydrated viscous materials, particularly malted milk and other dry malted food products, even though dry are still somewhat soggy when hot, and if the material is removed from the heated surface in this condition, it has a tendency toward compactness, which is undesirable. Experiments have shown that if this material is cooled or even freed from the heat prior to removal from the heated surface, it becomes more brittle and this brittleness not only facilitates removal of the material from the surface but materially improves the resultant product.

An object of the present invention, therefore, is to provide a method and means in the dehydration of syrup and like viscid material whereby a superior product is produced. More specifically, the invention contemplates the provision of a method and means which may be used in conjunction with, or as an attachment for the conventional type of drum drier and whereby certain undesirable characteristics in the product which result from prior known methods of manufacture are overcome.

The foregoing and other objects will become apparent in view of the following description taken in conjunction with the drawing, wherein:

Fig. 1 is a laterally transverse sectional view of one type of drying apparatus which may be used in carrying out the present improved method.

Fig. 2 is a top plan view thereof.

The method consists generally in applying or causing the viscid mass from which the dried product is obtained to adhere to a traveling heated surface, and when the layer of material becomes substantially dry, cooling the relatively warm or hot material or freeing it from heat sufficiently to avoid compactness and impart brittleness thereto, and thereafter scraping the material from said surface and disintegrating or further treating the same.

Referring to the drawing in detail, the reference numeral 5 generally designates a drying drum which is heated by steam or other suitable heating medium introduced into the drum as by means of a supply pipe or conduit 6 which communicates axially with one end of the drum. Adjacent the drum a rotatable cooling cylinder or supplemental drum 7 is mounted, and over these drums is trained an endless material conveying belt or band 8 which is preferably comprised of metal or other suitable material not affected by the chemical action of the material undergoing treatment and which is non-absorbent, smooth and easily cleaned. The cylinder or supplemental cooling drum 7 may be cooled by water, brine or any other suitable cooling agent which may be introduced into the drum by means of an axial pipe 9 arranged substantially similarly to the pipe 6. Between the drum 5 and cylinder 7 and adjacent the path of travel of the belt 8 an additional or supplemental cooling member herein shown in the form of a compartment or hollow casing 10 is preferably mounted. While only one member 10 is shown in the present instance, it will be understood that any number thereof may be used to obtain the desired cooling action.

The material to be dried may be applied to the exterior of the drum by any suitable means well known in the art, such as by means of a supply pan 11 disposed below the drum and arranged so that the belt 8 will dip into the bath of sticky viscid material and cause it to adhere to the belt, and directly in advance of the pan 11 a spreader 12 is adjustably mounted whereby the material is distributed uniformly over the exterior surface of the belt. Preferably adjacent and below the cooling drum or cylinder 7 a scraper or knife 13 is mounted and is adjustable by means of the hand wheel 14 to scrape the material from the belt 8. As the material is removed from the belt, it drops into a conveyor, generally indicated at 15, whereby it is removed for disintegration, or subsequent treatment.

The main drum 5 may be driven by any suitable means not shown in the drawing since it forms no part of the present invention, while the cooling cylinder or drum 7 may be an idler which rotates with the belt 8.

The present improved apparatus has proved of exceptional value and utility in the manufacture of malted milk and other dry malted products, the syrup or viscous fluid from which the water is to be extracted being heated and dried as it travels around on the belt 8; and upon reaching the area adjacent the cooling compartment 10 and cylinder 7, the material is subjected to a cooling action or at least freed from heat sufficiently to cause it to become somewhat brittle and loose, or avoid any tendency towards sogginess and compactness which has been found undesirable in the manufacture of malted milk, malt sugar, and the like. The cooling action also facilitates removal of the material. Thus it will be seen that the material is first heated and dried on a traveling surface, and while still on said surface, it is cooled and rendered brittle, and then removed. By this means the resultant product is materially improved, and this improvement necessitates no complex machinery, and in fact the mechanism for effecting this desirable operation may be used as an accessory or attachment to the conventional drum drier. The relative dimensions or sizes of the heating and cooling drums or cylinders may of course be varied to suit conditions and to obtain the desired heating, drying and cooling action.

In certain instances, as for example where space is not a factor to be dealt with, the cooling agent in the supplemental drum 7 may be dispensed with, and this also holds true with respect to the cooling member or casing 10, the band or belt 8 then being made of sufficient length to insure the desired cooling action on the material prior to being sprayed from the belt by the scraper 13. The primary object in view in the present invention is to provide a practical means of regulating the cooling action on the material before it is scraped from the belt 8, and this may be accomplished, although perhaps not so accurately regulated, by simply extending the belt or band 8, or having it of sufficient length to insure the required cooling or release of heat from the material after it has been subjected to the heating action in the main drum 5 and prior to being released from the surface to which it was initially applied.

It will be understood that certain changes and modifications in the mechanism for carrying out the method may be adopted within the scope of the invention as defined by the appended claims.

I claim:

1. In apparatus for dehydrating viscous fluids, a main heating drum, a cooling cylinder mounted adjacent said drum, an additional cooling compartment mounted adjacent said cooling cylinder, an endless conveyor belt trained over said drum and cylinder to which the fluid is caused to adhere during treatment, means for introducing a heating agent into said drum to expedite the drying action on the fluid, means for introducing a cooling agent into said cylinder and compartment to cool the dehydrated material, and means for removing the material after cooling.

2. Apparatus for dehydrating viscous fluids comprising: a main rotatable heating drum, a rotatable cooling cylinder, an endless traveling conveyor belt trained over said drum and cylinder, a container for the fluid into which the belt dips and withdraws the fluid, means for spreading the material over the surface of the belt, means for heating said drum, means for cooling said cylinder, and means for removing the material from the belt after it has been subjected to the action of the cooling cylinder.

3. In the manufacture of malted milk and analogous products, apparatus for treating viscous fluids to dehydrate the same comprising a rotatable drying drum, an endless conveyor belt or band trained over said drum, means for introducing a heating agent into the drum, means for spreading the fluid material over the surface of said belt to thereby subject the material to the heating action of said drum, and a rotatable unheated cylinder coacting with said drum over which said belt or band is also trained, said cylinder being spaced from the drum to provide an unheated belt stretch between the drum and cylinder on which the material is freed of heat sufficiently to impart a certain degree of brittleness thereto and reduce subsequent compactness of the material, and means for scraping the cooled material from said belt, said latter means being located at a point with respect to the belt to effect removal of the cooled material prior to its return to the heated drying drum.

4. Apparatus for treating viscous fluids to dehydrate the same comprising a rotatable drier drum, a cooling member mounted adjacent said drum, an endless conveyor band trained over said drum and member for conveying the fluid during treatment, said band contacting the major portion of the surface of said drum, means for heating said drum to expedite drying of the material on said band, means for cooling said member to cool the dedhyrated material, and means for removing the material from said band after being subjected to the action of the cooling member.

SHIRLEY A. McDOUGALL.